Aug. 18, 1931.  A. SCHOPPER ET AL  1,819,719
APPARATUS FOR TESTING TENSILE STRENGTH
Filed March 8, 1929
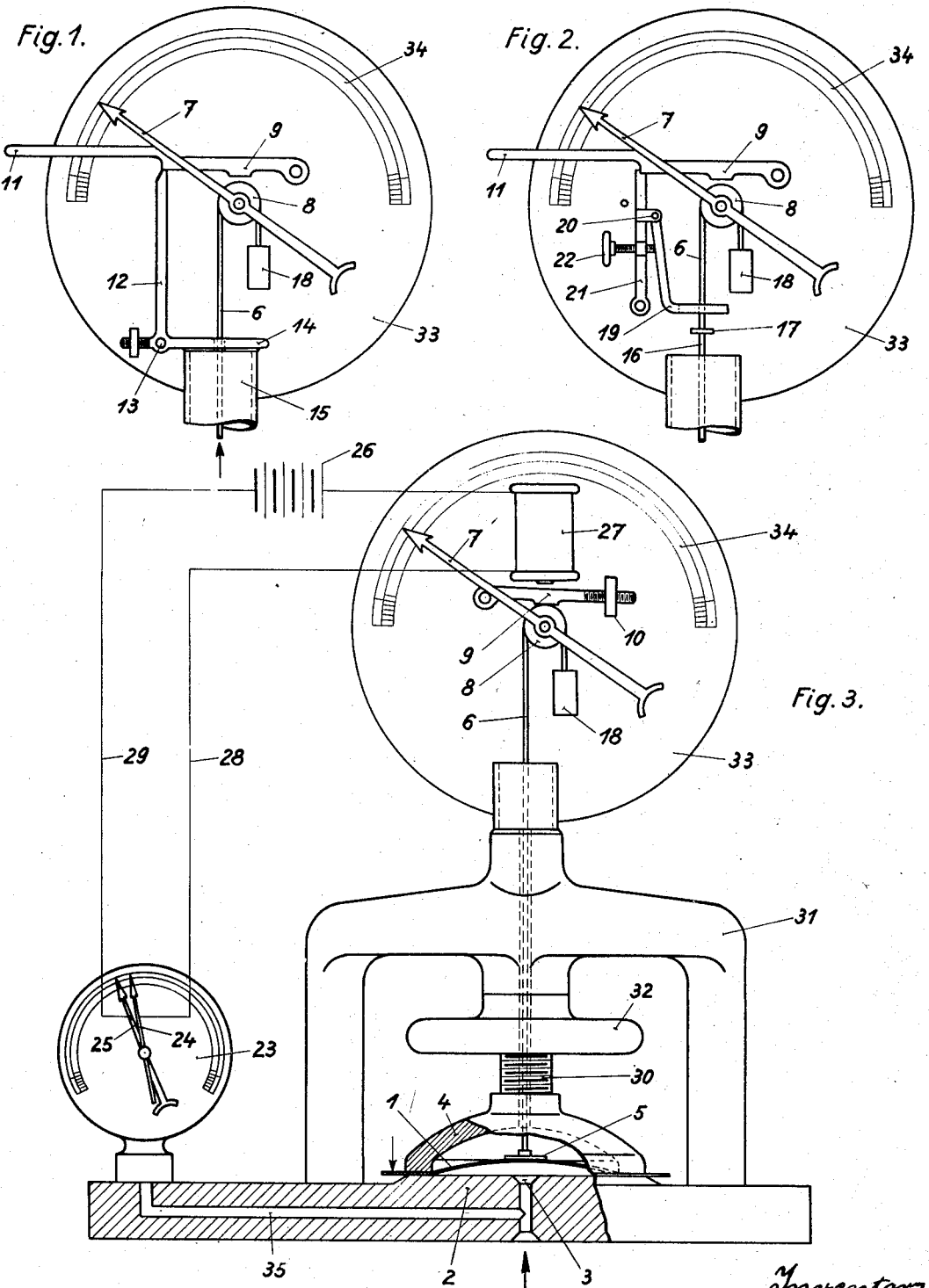
Inventors:
Alfred Schopper
Gustav Dalén
by [signature]
Atty.

Patented Aug. 18, 1931

1,819,719

UNITED STATES PATENT OFFICE

ALFRED SCHOPPER, OF LEIPZIG, AND GUSTAV DALEN, OF BERLIN-DAHLEM, GERMANY, ASSIGNORS TO THE FIRM LOUIS SCHOPPER, OF LEIPZIG, GERMANY

APPARATUS FOR TESTING TENSILE STRENGTH

Application filed March 8, 1929, Serial No. 345,504, and in Germany September 20, 1926.

Our invention relates to apparatus for testing the tensile strength of flexible materials by inflation and more particularly to apparatus of this kind in which the camber of the inflated part is measured by a suitable gauge, as this camber is a function of the ultimate tensile strength.

It is an object of our invention to provide means for more exactly measuring the camber. To this end the indicator of the gauge, with the aid of which the camber is measured, is automatically arrested at the moment when the part bursts so that its ultimate strength may be read at leisure.

In the drawings affixed to this specification and forming part thereof an apparatus embodying our invention is illustrated diagrammatically by way of example In the drawings Figs. 1 and 2 are elevations of gauges having mechanical arresting means, Fig. 3 is an elevation of a complete testing apparatus, partly in section, with electric arresting means.

Referring now to the drawings, and first to Fig. 3, 1 is the part to be tested, 2 is the foundation plate of the apparatus, 3 is a vertical bore which is connected with a source of gas or air under pressure, not shown, 4 is a cup-shaped jaw at the end of a threaded spindle 30 which is displaced axially in an upright 31 by means of a handwheel 32, 5 is a plate suspended in the cavity of the cup-shaped jaw 4 and adapted to be engaged by the part 1, 6 is a cord or cable extending upwards from the plate 5 through a suitable bore in the spindle 30, 8 is a pulley on the gauge 33 on which the cord 6 is supported, 7 is an indicator on the shaft of the pulley, 34 is a graduation over which the indicator 7 is moving, 18 is a weight for imparting tension to the cord 6, 9 is a brake lever adapted to arrest the pulley 8 and the indicator 7, and 10 is a weight which is adapted to be displaced on the threaded end of the brake lever 9.

Various means may be provided for controlling the brake lever 9. Electric means are illustrated in Fig. 3, where 35 is a passage extending from the bore 3 in the foundation plate 2, 23 is a pressure gauge connected with the passage 35 and provided with an indicator 25 and a trailer 24, 28, 29 is an electric circuit controlled by the indicator and the trailer, 26 is a battery in the circuit, and 27 is an electromagnet adapted to attract the brake lever 9 as its armature.

While the indicator 25 is moving the trailer 24, the circuit 28, 29 is closed, the electromagnet 27 holds the lever 9 attracted and the pulley 8 with the indicator 7 is free to rotate so as to indicate the camber of the part 1. When the part 1 bursts the pressure in the passage 35 is reduced causing the indicator 25 to return and to break the circuit 28, 29 so that the lever 9 is free to arrest the pulley 8, holding the indicator 7 in the position which indicates the ultimate strength of the part 1.

Referring now to Fig. 1, 12 is a detent securing the brake lever 9 in its inactive position with respect to the pulley 8, 11 is an extension of the lever by which it is weighted, 13 is the pivot of the detent 12, 14 is a valve, and 15 is a pipe connected with the inside of the cup-shaped jaw 4 and adapted to be closed by the valve 14.

In the position illustrated the brake lever 9 is supported by the detent 12 and the valve 14 closes the air pipe 15. When the part 1 bursts, air from the cup 4 enters the pipe 15 and lifts the valve 14, causing the detent 12 to release the lever 9.

Referring now to Fig. 2, 16 is a rod connected with the plate 5 at one end and provided with a disc 17 at the other. The cord 6 is connected to the rod 16 above the disc 17. 19 is an angular lever fulcrumed to a detent 21 at 20. 22 is a screw by which the relative position of the lever 19 and the detent 21 may be varied.

When the part 1 bursts, the plate 5 is raised and in turn raises the disc 17, causing it to strike the angular lever 19 and to throw out the detent 21. By means of the screw 22, the arm 19 can be so adjusted as to cause the disc 17 to engage below the arm 19 at the proper time.

We wish it to be understood that we do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

We claim:—

1. An apparatus for testing tensile strength comprising means for holding the part to be tested, means for supplying gas under pressure to one side of said part, a gauge for indicating the camber of said inflated part, and automatic means for arresting the indicator of said gauge when said part bursts.

2. An apparatus for testing tensile strength comprising means for holding the part to be tested, means for supplying gas under pressure to one side of said part, a gauge for indicating the camber of said inflated part, and automatic means under the control of the gas by which said part is inflated for arresting the indicator of said gauge when said part bursts.

3. An apparatus for testing tensile strength comprising means for holding the part to be tested, means for supplying gas under pressure to one side of said part, a gauge for indicating the camber of said inflated part, and automatic means under the influence of the reduction of pressure caused in the gas by which said part is inflated by the bursting of the part for arresting the indicator of said gauge when said part bursts.

4. An apparatus for testing tensile strength comprising means for holding the part to be tested, means for supplying gas under pressure to one side of said part, a gauge for indicating the camber of said inflated part, a brake for arresting the indicator of said gauge, and means for operating said brake under the control of the gas issuing from said part when it bursts.

5. An apparatus for testing tensile strength comprising means for holding the part to be tested, means for supplying gas under pressure to one side of said part, a gauge for indicating the camber of said inflated part, a brake lever on said gauge adapted to arrest its indicator, a detent adapted to hold said lever in inactive position with respect to said indicator, a pipe line extending from the convex side of said part to said gauge, and a plate adapted to be raised by the air flowing from said pipe line, said plate being operatively connected with said detent so as to release said brake lever when gas flows in said pipe line.

6. An apparatus for testing tensile strength comprising means for holding the part to be tested, means for supplying gas under pressure to one side of said part, a gauge for indicating the camber of said inflated part, a plate adapted to engage said part on the convex side and operatively connected with said gauge, means for arresting the indicator of said gauge when said part bursts, and means operatively connected with said plate for releasing said arresting means.

7. An apparatus for testing tensile strength comprising means for holding the part to be tested, means for supplying gas under pressure to one side of said part, a gauge for indicating the camber of said inflated part, a brake lever on said gauge adapted to arrest its indicator, a detent adapted to hold said lever in inactive position with respect to said indicator, a plate adapted to engage said part on the convex side and operatively connected with said gauge, and means operatively connected with said plate for throwing out said detent when said part bursts.

In testimony whereof we affix our signatures.

ALFRED SCHOPPER.
GUSTAV DALÉN.